UNITED STATES PATENT OFFICE.

ARTHUR C. SPENCER, OF WASHINGTON, DISTRICT OF COLUMBIA.

PROCESS OF RECOVERING POTASH.

1,344,830. Specification of Letters Patent. Patented June 29, 1920.

No Drawing. Application filed November 17, 1915. Serial No. 61,935.

*To all whom it may concern:*

Be it known that I, ARTHUR C. SPENCER, a citizen of the United States, residing at Washington, in the District of Columbia, have invented certain new and useful Improvements in Processes of Recovering Potash, of which the following is a specification.

This invention relates to processes of recovering potash; and it comprises a method of recovering potash from certain natural rocky materials containing potassium in a state of combination, such natural materials being amorphous in whole or in part, and from certain other and more crystalline natural silicate material after a preliminary roasting or fusion of such material to render it amorphous, wherein the amorphous or amorphized material from which the potash is to be recovered is heated under pressure with one or more of a certain group of salts of strong bases in certain proportions to effect a metathetical exchange of the base of said salt for the potash of the rocky material, such group of salts being sodium chlorid, magnesium chlorid, sodium sulfate, ammonium chlorid, ammonium sulfate and calcium chlorid—in some cases, it being also possible to use sodium carbonates or ammonium carbonate in lieu of the members of the group just defined, and such heating under pressure being best effected in the presence of a liquid which is a solvent for said salt and being under a pressure of from one to 50 atmospheres during a period of six hours, more or less; all as more fully hereinafter set forth and as claimed.

While potash is relatively expensive it is, as is well known, widely distributed through the rocky materials which constitute the igneous rocks. It is a large constituent of the very common rocky materials, granite, gneiss, nephelite, syenite, mica schist, feldspar, greensand, leucite, etc. Unfortunately in these rocks and materials it is combined with silica and other materials in such a way as to resist most chemical reagents as ordinarily used. Very many efforts have been made to recover the potash from these intractable materials, but these efforts for the most part have not proved a commercial success. In practice it is commonly believed impossible to recover potassium salts from silicate rocks and the like at any price which would allow their use for commercial fertilizers; that is on a basis, of, say, 3 to 5 cents per pound of $K_2O$. Most of the operations heretofore described have been too expensive; they have involved fusion or the use of relatively expensive chemicals. Naturally, the chemicals which will attack these silicate rocks at a high temperature will also attack furnace materials and it is difficult to use them for this reason.

Most of the methods which have been proposed involve what may be called violent reactions; reactions in which the material is "broken down" and its identity as a mineral matter is destroyed; this breaking down being usually by fusion with various chemicals.

I have discovered that the extraction of potash from many of these rocky materials is not difficult if the principles of mass action be used; that with many of them potash can be extracted in a very simple, economical and ready method wherein such material is treated with a solution of the chemical in such a manner as to effect a metathetical exchange between the base of the salt in solution and the potash of the silicate material, heat and pressure being used to quicken the action. In this exchange the action is merely to substitute one base for another in the minerals used; to replace the potassium in the rock by another base while the potassium goes into the solution. Quite unexpectedly, it has been found that many of these reactions go forward quite readily with aqueous solutions at temperatures which are not very high; say the temperatures corresponding to 150 to 300 pounds steam pressure. If higher temperatures are employed even better results are attained. It will be apparent that this method has the advantage of extreme simplicity and cheapness.

Not all salts are effective or desirable for this action, but I have found that certain ones may be used. The group of salts which I have found to be effective for this purpose consists of sodium chlorid, sodium sulfate, calcium chlorid, magnesium chlorid and ammonium chlorid. Ammonium sulfate may also be used. Under certain circumstances, sodium carbonate or ammonium carbonate may also be used for effecting the simple metathetical exchange here desired.

I have found that if I heat glassy basalt with a solution of sodium chlorid in such an amount and of such strength that somewhat more than two equivalents of sodium are present in the zone of reaction in the dissolved form for each equivalent of potassium in the mineral, that after about six hours heating at around 200° C., the potassium of the mineral will be practically altogether in solution while the mineral has taken up a corresponding amount of sodium. In other words, I have converted a potassium mineral into a sodium mineral while abstracting potassium in the form of a soluble salt. In this action the mineral is, or may be, left in much its original form and of its original character—the only substantial change being chemical in that there is a substitution of one base for another in its constitution. The reaction involved is, of course, a mass action phenomenon; and I have found it necessary that the sodium of the sodium chlorid be present in several times the amount of potassium to be extracted from the rock; that is, as stated above, there should be at least two chemical equivalents of sodium for each equivalent of potassium. There may be more, which will quicken the action, but there should be ordinarily at least two equivalents, though occasionally in some instances I have used as little as 1.5 equivalents. For a given degree of extraction less of the extracting salt may be used if the extraction is performed in stages; the material being first treated with a portion of the extracting salt; the extracted residue with another portion and so on till the desired amount of extraction is effected. In other words by treating and retreating more potash may be extracted with less extracting salt than where the total amount of extracting salt is used in one treatment. If there be other bases present in mineral compounds which are of such molecular constitution that they can, (like potassium) be substituted by sodium, such for instance as calcium, (although this particular case rarely occurs), it may be necessary to increase the amount of sodium chlorid somewhat. For instance, in treating previously ignited mica containing 8 per cent. of K and 0.1 per cent. of Li, it is advisable to use a solution containing the same amount of Na as would be used for straight potassium mica, containing 9 per cent. potassium. For each 100 pounds of mineral containing, say, about 8 per cent. of K it is desirable to use about 25 pounds of NaCl in solution. From 10 to 30 per cent. of the sodium chlorid supplied will ordinarily be recovered to be used again, but larger proportions may be regained. There are many rocky materials, such as feldspar, and in general what are termed the acidic rocks, since they contain a relatively large amount of silica, which will not readily yield to the described digestion with a solution of sodium chlorid while in their natural state; at least not without a relatively long digestion. But even these minerals and rocky materials may be made amenable to the present process by a preliminary heating sufficient to fuse them or at least to destroy either the normal molecular structure or the crystalline structure, one or both; a heating which may be sufficient to convert the little reactive crystallized material into the more reactive amorphous material. For brevity such a treatment may be called an amorphizing heating.

Among the materials which are directly used for my purpose may be listed: potassiferous nephelite, syenite, leucite· basalt. (especially imperfectly crystallized varieties), volcanic glass, volcanic tuffs, glauconite or greensand marl and "Litchfield marl". Mica schist and feldspar are best ignited or amorphized previous to metathetical treatment; and the same preparatory step may be used for other materials.

In the ordinary routine operation of my process, I break up the rock or mineral so as to granulate it. Reduction to a powder is not necessary and is not usually desirable, though, of course, fine grinding may be practised without departing from my invention. Wheat-size grains work very well. This comminuted material I place in a digester capable of withstanding up to, say, 300 pounds pressure under working conditions. An ordinary steam boiler may be successfully used. The salt should be as stated used in the proportion of about two equivalents of NaCl for each equivalent of K present, additional allowance being made for other substitutable bases, if present, as already indicated. If a greater proportion of salt is used, as stated, somewhat quicker work will result. The salt may be used as a saturated solution or as a weaker solution, this being a matter of convenience. The mixture of rock and salt solution may be heated for any length of time desired. I ordinarily find six hours' treatment to be all that is necessary with this class of minerals. The digestion being complete, the mixture is blown out of the digester or otherwise removed and the liquid drained from the insoluble residue. This insoluble residue may be washed with water and the washings which are charged with dissolved salt used as the treatment liquid in another operation. The leachings or drainings from the digestion charge contain substantially only potassium chlorid and sodium chlorid. They are concentrated and crystallized to separate the two, the sodium chlorid being returned for use anew.

Instead of using sodium chlorid in this operation, I may use sodium sulfate solution in equivalent amounts in exactly the same way and with substantially the same results. Or I may use calcium chlorid.

Magnesium chlorid may be used, but is not quite as good, since it tends to liberate hydrochloric acid which not only has a tendency to attack the metal of the digester but also interferes with the simple metathetical exchange which is here desired. Ammonium chlorid operates particularly well for the present purposes; and ammonium sulfate is also useful. Calcium sulfate cannot be usefully employed, since its relative insolubility renders it less reactive.

In an excellent embodiment of the present invention, in lieu of using sodium chlorid I employ ammonium chlorid. Ammonium sulfate may be used but is not quite as good. In the case of ammonium chlorid, and again where the sulfate is used, the mixture need not be neutral as is the case with the other salts described but may have an addition of free ammonia which tends to restrain dissociation of the ammonium salt, and helps to maintain desirable pressures at relatively low temperatures, and has other desirable effects. So far as silicates are concerned, ammonia is not a strong base and exercises no destructive action. Strong bases, such as lime (CaO), potash, soda, etc., are not used in the present invention since, like strong acids, they have a tendency to destroy or break down the mineral and do not give the metathetical reaction which is the underlying principle of the present invention. For example, in attacking feldspar with lime, as has often been proposed, the silicate combination of the feldspar is broken down to give new basic bodies; with, sometimes, an evolution of the potash in the vapor form. This is typical of what may be called the breaking down reactions.

In a typical embodiment of my invention using ammonium chlorid on greensand I may use somewhat more than two equivalents of such ammonium chlorid for each equivalent of potassium present, two equivalents for each equivalent of sodium, and two equivalents for each equivalent of ferrous iron if the latter is present. Glauconite, the basis of greensand or greensand marl, is a mineral of variable constitution, and materials from different localities may react very differently toward replacing bases such as ammonium; ferrous iron which is readily replaceable in some varieties being only slightly replaceable in others. Therefore, in practice the most advantageous amount of ammonium chlorid to be employed over and above the two equivalents each for potassium and sodium must be determined by trial in each case where a particular greensand is used. In terms of weights the foregoing may be stated substantially in the following terms: For each pound of $K_2O$ in the material under treatment I provide about 0.72 pound of $NH_3$ either all as $NH_4Cl$ or substantially half in this form and the remainder, together with any excess desired for its mass action, as ammonia gas which may be dissolved in water. For each pound of $Na_2O$ present in said material I provide about 1.10 pounds of $NH_3$ in the same way as for $K_2O$. I similarly provide 0.94 pound $NH_3$ for each replaceable pound of FeO. Following the above, if I am treating green sand containing 7 per cent. $K_2O$, 2 per cent. $Na_2O$ and 2 per cent. FeO, there are required 101+43+38=182 pounds of $NH_3$ corresponding with about 572 pounds of $NH_4Cl$, or if $NH_4Cl$ and ammonia are used together, say, 286 pounds of $NH_4Cl$ and 91 pounds of ammonia gas, per ton of material under treatment.

Where ammonium chlorid and ammonia gas are used together ammonium hydroxid is probably the direct agent of the replacement that occurs, as I may operate and preferably do operate below 130° C. Dealing with minerals of the type illustrated by glauconite, I have some such reaction as indicated in the following skeletonized equation:

$$H_2O.K_2O.Fe_2O_3.4SiO_2 + 2NH_3 + H_2O = H_2O(NH_4)_2O.Fe_2O_3.4SiO_2 + 2KOH.$$

This substitution is accompanied by reaction between KOH and the $NH_4Cl$ present according to the following:

$$2KOH + 2NH_4Cl = 2KCl + 2NH_3.$$

Or expressed otherwise the chlorid radical is being continually taken up by potassium, and the concentration of ammonia gas remains constant. In the foregoing the typical formula $H_2O.K_2O.Fe_2O_3.4SiO_2$ is used to represent glauconite though the molecular constitution of the mineral appears to be not constant.

The foregoing statement leads to consideration of the principal advantages of using ammonia gas under pressure in addition to an ammonium salt of a mineral acid such as the chlorid. Among these advantages are the less amounts of ammonium chlorid that need be employed; only a small excess over the amount equivalent to the extractable bases being required, the displacement of the reaction equilibrium being carried to essential completion because of maintained concentration of $NH_3$ in the presence of water or of water vapor, one or both. Furthermore, the unconsumed reagent is recoverable at a minimum possible cost by merely releasing pressure, the ammonia being blown over into a gas holder. Any excess of ammonium chlorid may be decomposed by lime in order to recover the ammonia, the ammonia gas being saved according to well known methods. It is practicable, especially when ammonia gas is used, to greatly reduce the amount of water employed and even to work with water-free $NH_4Cl$.

In the described action upon the silicates using ammonia, a certain and usually quite definite amount of ammonia is of course fixed in the mineral matter and remains with it after the action in the substitution described. This ammonia may be recovered by subsequently heating the material to a low red heat; but inasmuch as ammonia thus fixed in the material makes such material a useful form of fertilizer, the residual mineral matter may be marketed as fertilizer.

A feature of this embodiment of my process using ammonia and ammonia salts is that crude ammoniacal products such as by-products from by-product coke ovens or from gas works or other sources may be utilized, forming an outlet for ammonia without the usual disadvantages of the necessity of fixation by means of such expensive reagents as sulfuric acid. By use of certain crude materials containing ammonia, various acid radicals may be introduced into the brines derived from the treatment of potassium-bearing silicate, and in general the resulting mixture of salts is not disadvantageous where fertilizer products are being made. In case of certain highly alkaliferous rocks containing above 6 and up to 9 per cent. of K, sodium is also present in equivalent or even greater amounts, and with such materials the solid residual product after the described operation may contain the equivalent of from 8 to 10 per cent. or even more of ammonia ($NH_3$). Dried at a moderate temperature this material retains the fixed ammonia and may be advantageously employed as nitrogenous fertilizer. In the rocks, where water of constitution is present, even a portion of this water may be replaced by the ammonia.

In an advantageous embodiment of my process using such highly alkaliferous rocks, which however in their natural state are unavailable as fertilizers, I may treat the material with ammonia and ammonia salts in the manner described to extract the alkalis as soluble salts while fixing ammonia in the residue. Thereafter, I recover the potassium or potassium and sodium salts from the solutions formed and return them to the ammonia-containing residual rocky material. I now have a material containing fixed but easily available ammonia and readily available soluble potash salts. This is a nearly complete fertilizer; and merely needs the addition of some phosphate to form a complete fertilizer.

Where ammonia compounds are utilized, and especially where crude compounds are utilized, as in cases where ammonia gas is utilized as one of the reagents in the described heat-pressure treatment of potassiferous silicate material, lower temperatures are effective than where neutral salts of sodium and calcium are employed. I have obtained very good results when working at temperatures around 130° C. By providing both ammonia and water the total pressure that would result at a given pressure if ammonia were to be used alone is greatly lowered.

In this and other illustrations of my process it is to be understood, as previously stated, that instead of introducing all of what I may term the replacing reagent at the beginning of the operation the potassiferous mineral may be treated by successive proportions of the reagent. In this variation the replacement of potassium by another base is carried on in stages, liquors enriched in potash being replaced several times by fresh solutions.

Sodium carbonates are also salts which may be used to effect metathetical reaction and extraction of potassium in the manner described, provided the solution be maintained under pressure in such manner as to prevent escape, or substantial escape, of carbon dioxid. If the carbon dioxid be allowed to escape, the reaction secured is the breaking down reaction of the materials and not the herein described metathetical action. Where the carbon dioxid is allowed to escape, alumina and silica go into solution. With a solution of sodium carbonate properly handled, a metathetical reaction may be secured with solution of only minimal amounts of alumina and silica; that is the breaking down or destruction of the silicate under treatment does not occur. Any slight solution of alumina and silica which may take place, ordinarily does so only at the time when the pressure is released from the digester. Because of its greater richness in carbonic acid sodium bicarbonate is more effective in producing the simple metathetical reactions here desired than is the ordinary carbonate. However the latter may be employed.

Ammonium carbonate may be employed in lieu of sodium carbonate under the same conditions; that is, with prevention of the escape of gases.

While in the present reaction the reaction desired is purely metathetical without breaking down or destruction of the mineral, there being merely a substitution of one base for another, yet the mineral may be more or less changed in a minor way. One of the results of the treatment may be to hydrate it. That is, while the mineral will have its original constitution, broadly, with the substitution of the replacing base employed for the potassium originally present, yet it may also be changed in so far as is incident to taking up water of constitution. Hydrated zeolites thus formed may be used for various purposes. For example, leucite which has the general formula $K_2O.Al_2O_3.4SiO_2$, on treatment in the present method has its potassium replaced by sodium with production of the corresponding sodium mineral (analcite). This analcite however usually carries two molecules of $H_2O$.

In this operation it is desirable to economize the amount of heating necessary in the digestion operation proper by a methodical procedure. Heating under pressure in a digester requires the transfer of many heat units which is a slow operation with digesters of proper types. To this end I therefore advantageously heat the solution before placing in the digester and similarly preheat the mineral in any desired manner, as in rotary drums or kilns, etc., prior to mixing them together in the digestion.

Any apparatus of suitable type may be used in performing the described operations. Autoclaves, boilers, paper pulp digesters, etc., may be employed. The particular nature of the apparatus is not very material here so far as it is capable of handling relatively large amounts of granulated mineral matter and solution under heat and pressure and be provided with convenient charging and discharging means. Agitation is often advantageous although not indispensably necessary. When its use is resorted to, rotary digesters, stirrers, etc., may be employed.

In using the stated soluble salts in the present invention instead of artificially prepared solutions, bitterns or natural brines may of course be employed. In the case of certain bitterns and natural brines containing small amounts of potash, such as those from Searles Lake, California, bitterns from salt making plants, such as those at Salt Lake, etc., the present process offers a desirable method of enrichment.

What I claim is:—

1. The process of recovering potash from silicates which comprises submitting an amorphous silicate material containing potassium to a metathetical reaction with a neutral salt of a strong base under heat and pressure and in the presence of a solvent and in the absence of any substantial amount of strong bases or acids, the amount of such salt being at least 1.5 equivalents for the potassium present in such silicate material.

2. In the recovery of potash from silicate materials, the process which comprises heating a crystalline silicate material containing potassium sufficiently to destroy its crystalline structure and thereafter submitting the amorphous silicate material to a metathetical reaction with a neutral salt of a strong base under heat and pressure and in the presence of a solvent and in the absence of any substantial amount of strong bases or acids, the amount of such salt employed being at least 1.5 equivalents for the potassium present in such silicate material.

3. The process of recovering potash from silicates which comprises submitting an amorphous silicate material containing potassium to the metathetical reaction with ammonium chlorid under heat and pressure and in the presence of a solvent, the amount of such ammonium chlorid being at least 1.5 equivalents of potassium in such silicate material.

4. In the recovery of potash from silicates, the process which comprises reacting upon a potassiferous silicate material at a high temperature and under high pressure with ammonium chlorid until a substantial proportion of the potassium in said material is exchanged for the base of the salt in solution.

5. In the recovery of potash from silicate materials the process which comprises exposing said silicate material in a closed chamber under pressure to the action of a hot solution of an ammonium salt.

6. In the recovery of potash from silicate materials, the process which comprises exposing said silicate material in a closed chamber under pressure to the action of a hot solution of an ammonium salt in the presence of an excess of free ammonia.

In testimony whereof I affix my signature.

ARTHUR C. SPENCER.